Patented Dec. 31, 1929

1,741,544

UNITED STATES PATENT OFFICE

EDGAR A. SLAGLE, OF TRENTON, AND BERRY MARVEL O'HARRA, OF WESTFIELD, NEW JERSEY, ASSIGNORS TO AMERICAN SMELTING AND REFINING COMPANY, OF NEW YORK, N. Y., A CORPORATION OF NEW JERSEY

PROCESS FOR BRIQUETTING FLUE DUST

No Drawing. Application filed September 9, 1926. Serial No. 134,573.

This invention relates broadly to the treatment of flue dust and similar metallurgical by-products, and more particularly it relates to the agglomerating of such material in order to change its physical condition from the form of loose dust or powder in which it is collected into compact, strong briquettes which will resist abrasion and fracture, and which will remain agglomerated throughout the transportation or handling to which it may be necessary to subject them, and until melted down or smelted for the recovery of the valuable contents.

The invention relates further to the treatment of material of this class with a certain class of re-agents in order to retain and increase certain of the colloidal properties of the material which have been found to be highly beneficial in developing to the greatest degree the strength and resistance to abrasion of the briquetted material.

The invention further consists in the new and novel features of operation, and the new and original arrangements and combinations of steps in the process hereinafter described, and more particularly set forth in the claims.

Flue dust, baghouse dust, Cottrell dust, fume and similar materials, which for convenience are designated by the term "flue dust" herein, are by-products of the metallurgical industry, consisting, in general, of fine particles of ore, of volatilized metals, or other fine materials which may be carried out of the furnaces with the gases, and which may be recovered from the gases in dust chambers, Cottrell precipitators or other suitable separating devices. Such materials almost invariably contain valuable constituents which it is desirable to recover. It will be readily apparent that these materials exist in a very fine state of subdivision, and that it would be useless to attempt to recover the values by again charging the material into the furnace from which it had once escaped, unless the physical form of the material is first changed from that of fine powder into some form of agglomerate.

It has heretofore been proposed to moisten this flue dust, fume, etc., mix it with a so-called "binding agent" such as cement, lime, plaster of Paris or similar material, and form the resulting more or less plastic mass into lumps or briquettes by such means as pug mills, briquetting presses and the like. It has been found, however, that briquettes made in this manner from most dusts are easily broken up and cannot be handled without excessive abrasion; when melted in a blast furnace they break up prematurely during their passage down through the furnace, thus greatly hindering the proper operation of the furnace and causing quantities of the dust to be again carried out.

A careful study of the colloidal properties of such dusts and fumes has been made, and has resulted in the discovery that most materials of this class contain colloidal matter which acts as a plastic binding agent in somewhat the same manner as plastic clay. The quantity of colloidal matter contained in these materials is not a fixed proportion, as some dusts contain more than others; but it has been determined that the quality of briquettes, that is, their strength and resistance to abrasion, increases when more of the colloidal matter is present. It is readily apparent, therefore, that the presence of maximum quantities of this colloidal matter is highly desirable.

It has been further found, however, as a result of the above mentioned studies, that the colloidal matter in most of these dusts, fumes, etc., is flocculated and rendered ineffective by the addition of small amounts of alkalis, such as lime, or of salts, such as calcium sulphate (plaster of Paris,) and that consequently briquettes made from dusts to which supposed "binders" have been added are actually less resistant to abrasion than briquettes made from the dusts alone.

On the other hand, the addition of small amounts of certain reagents have been found to have a highly beneficial effect on the colloidal matter in the dust, and hence on the briquettes made from it. By way of illustration, sulphuric acid, acid salts such as sodium acid sulphate, and so-called "buffer mixtures" such as a mixture of acetic acid and sodium acetate, may be taken as examples of suitable reagents. In fact, any material which has a deflocculating effect and which increases the colloidal matter in the dust may be used. The briquettes made from dusts which have been thus treated are greatly superior to those made from untreated dusts, or from dusts to which the so-called "binders" hereinbefore referred to have been added, both as to crushing strength and as to resistance to abrasion.

In carrying out this invention, the dust which it is desired to briquette may be mixed with a small amount of deflocculating agent, such, for example, as an acid, an acid salt or a buffer mixture. The amount of the agent necessary to defloccuate the colloidal matter in the dust to the highest degree will vary, with different materials, from one half of one percent up to 5 percent, preferably less than two percent being employed. The mixture may be moistened with sufficient water to form a plastic mass which may be worked until uniform and formed into lumps or briquettes in the usual manner.

If desired, the acid or other deflocculating agent may be added to the water with which the dust is to be moistened, as by this procedure a thorough and uniform mixture may be more easily secured.

As an example of the improved qualities of briquettes made by this process may be cited the following, which is typical of a number of tests that have been made: A sample of briquette was made from a certain dust with which 30 percent of water alone was added. A second briquette was made from the same dust, using the same proportion of water, and in addition sulphuric acid equivalent to 1.84 percent of the weight of the dust. Both briquettes were dried and subjected to an abrasion test under similar conditions. In this test the first briquette, made without the deflocculating agent, lost 44.5 percent of its weight by abrasion, while the second briquette, made with the deflocculating agent, lost only 6.2 percent of its weight. The example shows the greatly increased ability of the briquette made by this process to withstand handling or breaking up in the furnace.

The addition of 1.84 percent of sulphuric acid in the above example changed the hydrogen ion concentration or so-called pH value of a water extract of the dust, in which one gram of dust was extracted with 500 ccm. of water, by about 0.5, or from 3.8 to 3.5.

This process has been particularly applied to Cottrell plate treater dust, pipe treater dust and lead flue dust. It is especially adapted to the treatment of flue, Cottrell, treater and baghouse dust recovered at the lead smelters, or copper smelters treating leady mattes.

By the herein disclosed method it is possible to form flue dust, fume, and similar materials into compact, strong briquettes, which resist abrasion to a heretofore unknown degree. Briquettes made by this method will withstand any handling that it may be necessary to subject them to, and once charged into the furnace they will retain their shape until melted down, nor will they crumble or break into particles which may be carried out of the furnace with the gases.

The method is not difficult to practise, nor are skilled labor or special appliances of any kind necessary in carrying it into effect, as only the ordinary briquetting machinery is necessary. A variety of materials may be used for deflocculating the colloidal matter, which permits considerable range of choice and enables the operator to select that one which may be most cheaply and easily secured.

Although we have shown and described, and have pointed out in the annexed claims, certain novel features of the invention, it will be understood that various omissions, substitutions and changes in the several steps of the process may be made by those skilled in the art without departing from the spirit of the invention.

We claim as our invention:—

1. Process of briquetting fume containing colloidal matter which consists in mixing with the fume an acid deflocculating agent in amount less than 2 percent of the weight of the fume, together with sufficient water to make the mixture plastic, working the mixture into a uniformly plastic mass, then forming said mixture into briquettes, and drying said briquettes.

2. Process of briquetting fume containing colloidal matter which consists in mixing the fume with a deflocculating agent in amount less than 2 percent of the weight of the fume, and with water, working the mixture into a plastic mass, forming said plastic mass into briquettes and drying said briquettes.

3. Process of briquetting fume containing colloidal matter which consists in wetting the fume with water containing a small amount of an acid containing material, thereby to defloccuate the colloidal matter in the fume, working the mixture until uniformly plastic, then forming it into briquettes and drying the briquettes.

4. Process of briquetting fine metallurgical furnace fume containing colloidal matter which consists in adding to the fume, water containing a small amount of deflocculating agent, working the mixture to defloccuate the colloidal matter and to make the mixture plastic, forming said mixture into briquettes and drying the briquettes.

5. Process of briquetting fume containing colloidal matter which consists in adding to the fume, water containing a deflocculating agent in amount sufficient to defloccuate the colloidal matter, working the mixture until plastic, then forming it into briquettes and drying the briquettes, 6. Process of agglomerating fine metallurgical furnace fume which consists in mixing said fume with a deflocculating agent in amount sufficient to deflocculate the colloidal matter contained in said fume, and with water in amount sufficient to make a plastic mixture, working the mixture to a plastic mass, and forming said plastic mass into lumps.

In testimony whereof we have hereunto set our hands.

EDGAR A. SLAGLE.
BERRY MARVEL O'HARRA.